United States Patent
Fry et al.

(10) Patent No.: US 8,543,751 B2
(45) Date of Patent: Sep. 24, 2013

(54) COMPUTER CARD

(75) Inventors: Walter G. Fry, Houston, TX (US);
Jeffrey W. Diehl, Cypress, TX (US);
Peter Yen, Houston, TX (US); Lester J. Williams, Humble, TX (US); Fred F. Massoudian, Spring, TX (US); Long H. Huynh, Conroe, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1430 days.

(21) Appl. No.: 11/799,187

(22) Filed: Apr. 30, 2007

(65) Prior Publication Data
US 2008/0270663 A1 Oct. 30, 2008

(51) Int. Cl.
*G06F 13/00* (2006.01)
(52) U.S. Cl.
USPC ............................................ 710/300; 710/11

(58) Field of Classification Search
USPC .................... 710/300–304, 105, 313, 315, 11, 710/62
See application file for complete search history.

(56) References Cited

U.S. PATENT DOCUMENTS

| | | | |
|---|---|---|---|
| 5,799,036 A | 8/1998 | Staples | |
| 6,190,182 B1 | 2/2001 | Liebenow et al. | |
| 6,304,929 B1 | 10/2001 | Wallach et al. | |
| 6,567,273 B1 | 5/2003 | Liu et al. | |
| 7,427,217 B2 * | 9/2008 | Chou et al. | 439/660 |
| 2005/0114587 A1 | 5/2005 | Chou et al. | |
| 2005/0251609 A1 | 11/2005 | Chou et al. | |
| 2006/0036786 A1 * | 2/2006 | Kreiner et al. | 710/62 |
| 2006/0259651 A1 | 11/2006 | Liu | |

* cited by examiner

*Primary Examiner* — Clifford Knoll

(57) ABSTRACT

A computer card comprising a first connector to enable the computer card to communicatively couple to an electronic device when the computer card is inserted into an externally accessible slot of the electronic device. The computer card further comprising an expansion slot configured to receive an expansion card therein. The computer card further comprising a second connector to facilitate coupling of a peripheral device to the computer card.

20 Claims, 2 Drawing Sheets

COMPUTER CARD

BACKGROUND

Users value the compact size and sleekness of portable electronic devices, thereby making the electronic device light and easy to transport. In order to accommodate this need, manufacturers have removed many of the internal devices as well as the connectors which connect external peripheral device to the electronic device. However, in some situations, users need to be able to connect the electronic device to some types of peripheral devices. Unfortunately, with the absence of certain connectors on the electronic device, the user may be unable to connect a desired type of peripheral device to the electronic device.

DETAILED DESCRIPTION OF THE DRAWINGS

Figure 1:
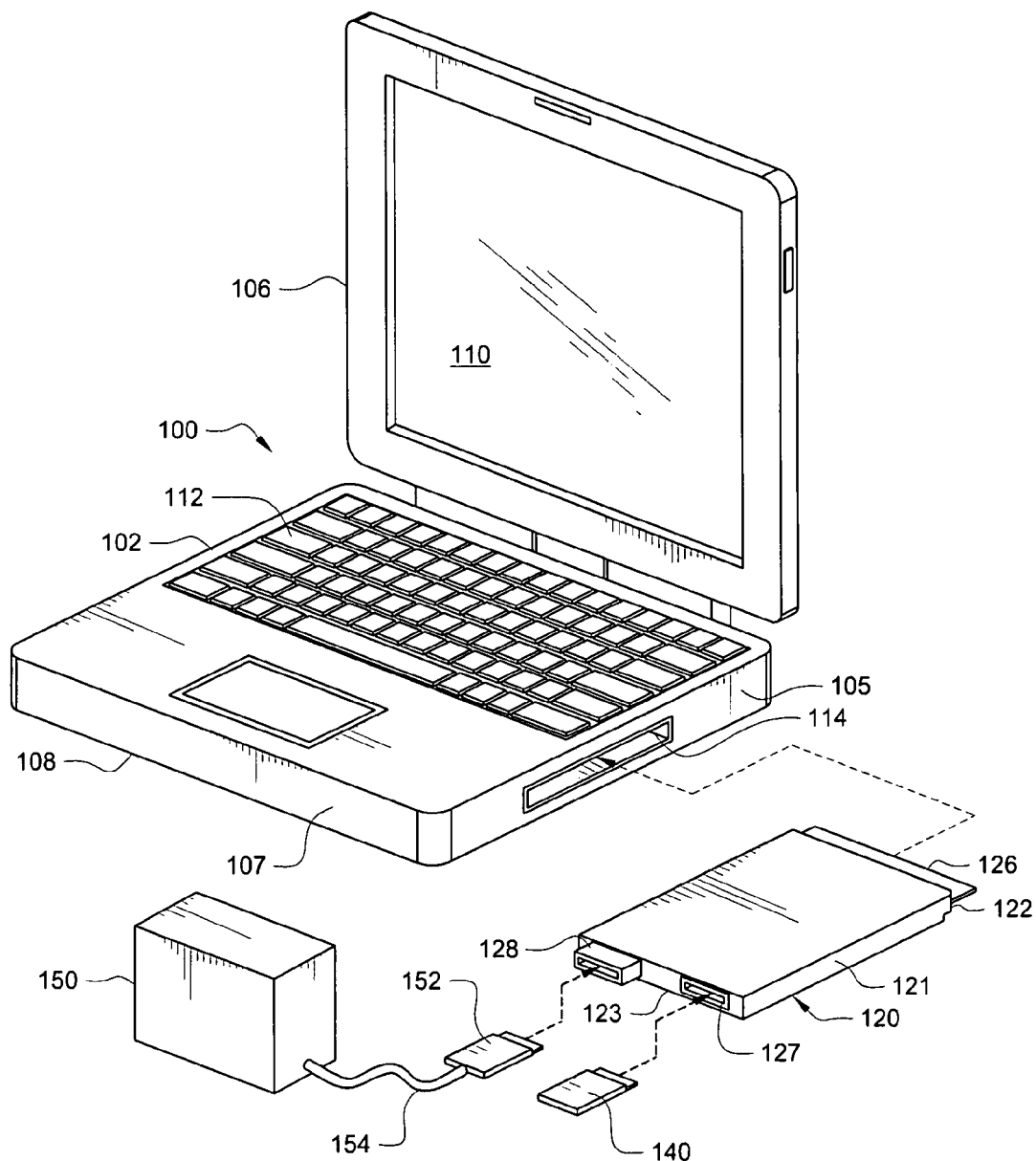
FIG. 1 illustrates an embodiment of a computer card for an electronic device.

FIG. 1 illustrates an embodiment of a computer card 120 for an electronic device 100. In the illustrated embodiment, electronic device 100 is a laptop or notebook computer 104. However, it should be understood that electronic device 100 can be any type of electronic device (e.g., a desktop computer, a tablet computer, a personal digital assistant (PDA), MP3 player, or a gaming device). In FIG. 1, electronic device 100 comprises a display member 106 rotably coupled to a base member 108. Display member 106 comprises a display screen 110. Base member 108 comprises a keyboard 112 and a slot 114. Slot 114 comprises an externally accessible bay for receiving a computer card 120 therein such that computer card 120 may be slid into and out of slot 114 to engage or disengage computer card 114 relative to electronic device 100. In the illustrated embodiment, slot 114 is disposed along a side 105 of a housing 107 of base member 108; however, it should be understood that slot 114 can be disposed along any edge or surface of display member 106 and/or base member 108. Slot 114 enables computer card 120 to slide into and be engageably coupled to electronic device 100 Computer card 120 can be any type of card (e.g., a Personal Computer Memory Card International Association (PCMCIA) card, an ExpressCard, ect.) which can interface with electronic device 102.

In the illustrated embodiment, computer card 120 comprises a housing 121 that comprises an internal surface 122 and an external surface 123. As used herein, the "internal" surface 122 of card 120 comprises a surface or portion of card 120 that is disposed within slot 114 when card 120 is disposed within slot 114, and the "external" surface 123 of card 120 comprises a surface or portion of card 120 that is accessible from an exterior of electronic device 100 when card 120 is disposed within slot 114. A connector 126 is disposed on internal surface 122 for coupling computer card 120 to electronic device 100. Connector 126 can accept any type of communications protocol (e.g., Peripheral Component Interconnect Express (PCI Express), Universal Serial Bus (USB), ect.). In the embodiment illustrated in FIG. 1, computer card 120 also comprises an expansion slot 127 and a connector 128 disposed on external surface 123. Expansion slot 127 enables an expansion card 140 to slide into and be engageably coupled to computer card 120, thereby enabling expansion card 140 to communicate and/or interface with electronic device 100. Expansion card 140 can be any type of electrical component (e.g., flash memory card, a video card, a network card, a sound card, etc.) which provides additional functionality to electronic device 100. A connector 128 is an interface that enables a peripheral device to be connected to card 120. For example, in FIG. 1, a connector 152 is communicatively coupled to a connector 128 to enable a dock 150 to be coupled to computer card 120. However, it should be understood that other types of devices may be coupled to connector 128 (e.g., a printer, a PDA, a hard disk drive, etc.). In FIG. 1, a cable 154 extends from connector 152 to dock 150; however, it should be understood that dock 150 may be otherwise coupled to connector 128. In some embodiments, dock 150 can support a variety of different devices that can communicate with card 120 (e.g., a camera, an optical drive, speakers, a microphone, ect.), thereby enabling the different devices to communicate with electronic device 100 as well.

Figure 2:
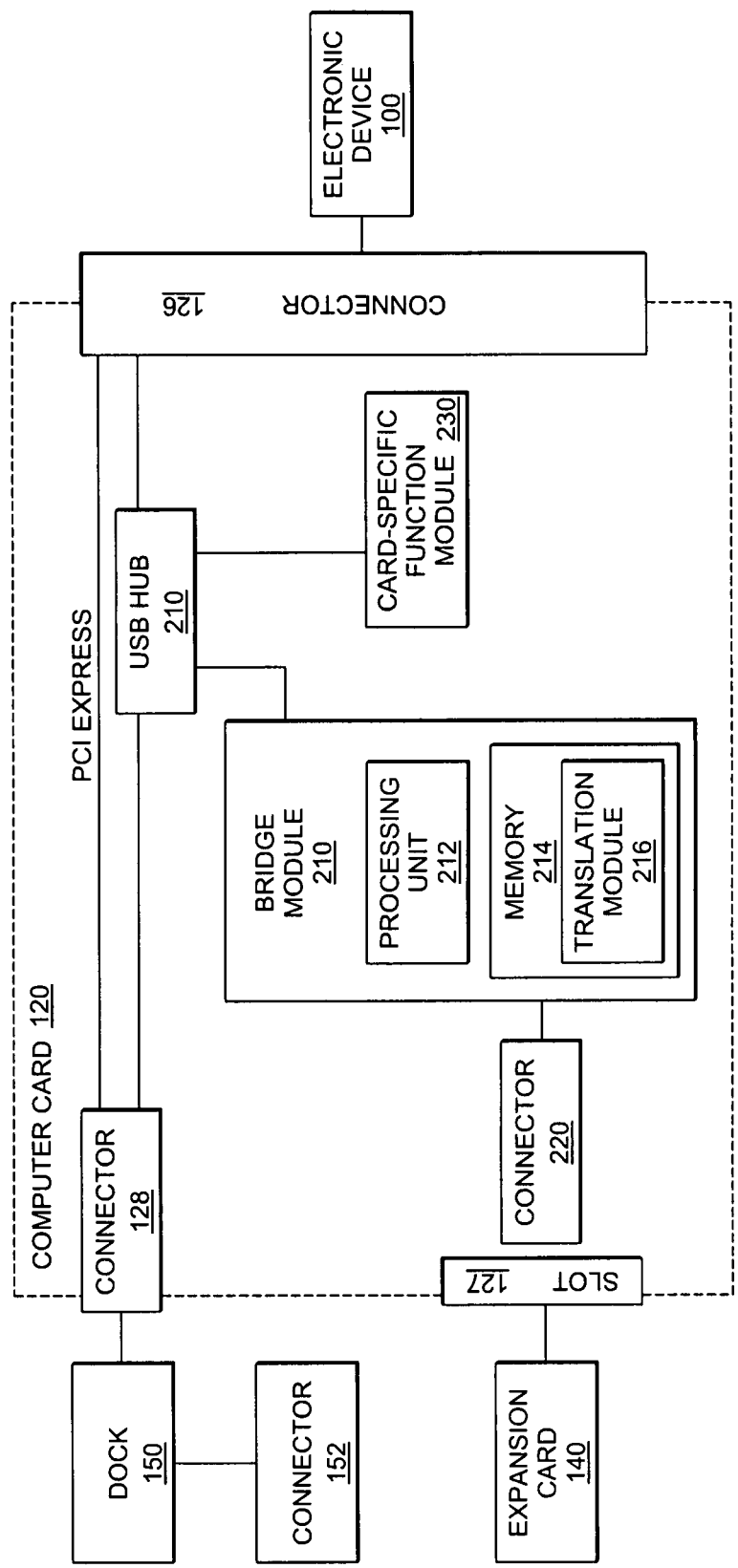
FIG. 2 is a block diagram for an embodiment of the computer card of FIG. 1.

FIG. 2 is a block diagram illustrating an embodiment of computer card 120. In the illustrated embodiment, computer card 120 comprises a universal serial bus (USB) hub 200, a PCI Express hub 202, a bridge module 210, a card-specific function module 230, and connectors 126, 128, and 220. All components within computer card 120 are a combined hardware and software embodiment. However, in alternative embodiments, the components may be a hardware-only or a software-only embodiment.

In FIG. 2, connector 126 communicatively couples computer card 120 to electronic device 100; connectors 128 and 152 communicatively couple dock 150 to computer card 120; and connector 220 communicatively couples expansion card 140 to computer card 120. USB hub 200 and PCI Express hub 202 are embedded, internal components which enables, respectively, one or more USB devices (e.g., expansion card 140 and dock 150) and PCI devices (e.g., dock 150, graphics card, ect.) to connect to computer card 120. USB hub 200 and PCI Express hub 202 are communications data busses which receive, transfer, and/or channel data between dock 150 and electronic device 100. USB hub 200 also receives, transfers, and/or channels data between expansion card 140 and electronic device 100. However, in alternative embodiments, it should be understood that computer card 120 may comprise one or both USB hub 200 and PCI Express hub 202 or any other types of communication hub.

Bridge module 210 is coupled to USB hub 200 and enables a variety of different types of components and/or devices (e.g. flash memory, video graphics, or sound card) to be connected to USB hub 200. Bridge module 210 comprises a processor 212 and a memory 214. Processor 212 executes a translation module 216 stored in memory 214. Translation module 216 is a protocol or a set of instructions which converts the signals and/or data transmitted and/or stored by expansion card 140 for use by electronic device 100. For example, translation module 216 formats the incoming data from expansion card 140 into a readable format for electronic device 100. Translation module 216 also converts the data and/or requests transmitted by electronic device 100 into a readable format for expansion card 140. Card-specific function module 230 also connects to USB hub 200. Card-specific function module 230 is a set of processors, hardware, and/or protocols (e.g., set of instructions) for executing the functions and/or features (e.g., additional memory or storage, wireless and/or network communications, or provide additional power) provided by computer card 120. USB hub 200 is coupled to electronic device 100 via connector 126.

Thus, in application, a variety of different electronic devices can interface with card 120. For example, dock 150 communicates and receives/transmits data between the variety of different electronic devices and electronic device 100 via card 120. USB hub 200 and PCI express hub 2024 are the communications data channels or mediums that transfers data between electronic device 100 and dock 150. Expansion card 140 communicates and receives/transmits data and/or a request to electronic device 100 via bridge module 210 and USB hub 200. When expansion card 140 transmits data and/or a request, processing unit 212 of bridge module 210 reads the data and/or request. Processing unit 212 then determines and identifies the correct format, if needed, for the data and/or request. Processing unit 212 then executes translation module 216 to the correct format, if needed. Processing unit 212 then transmits the data and/or request in the correct format to USB hub 200. USB hub 200 subsequently channels the request to electronic device 100. Card-specific function module 230 continues to execute and/or provide the functions and/or features to electronic device 100 while electronic device 100 communicates with expansion card 140 and dock 150.

Thus, embodiments of computer card 120 may be manufactured by providing connector 126 on computer card 120 to enable computer card 120 to communicatively couple to electronic device 100 when computer card 120 is inserted into externally accessible slot 114 of electronic device 100. The method of manufacturing may also comprise providing expansion slot 127 on computer card 120 configured to receive expansion card 140 therein. The method of manufacturing may further comprise coupling bridge module 210 to expansion slot 127, wherein bridge module 210 is configured to translate a data signal received from expansion card 140 to a format readable by electronic device 100. The method further comprises coupling a data hub (e.g., USB hub 200) to bridge module 210, wherein the data hub is configured to channel communications between bridge module 210 and electronic device 100. The method of manufacturing may also comprise coupling a data hub to dock 150, wherein the data hub is configured is configured to channel communications between dock 150 coupled to computer card 120 and electronic device 100. The method of manufacturing may further comprise providing expansion slot 127 configured to receive at least one of flash memory card and a network card. The method of manufacturing may also comprise providing another connector (e.g., connector 128) to facilitate coupling dock 150 to computer card 120. Moreover, the method of manufacturing may further comprise providing card-specific function module 230 for electronic device 100.

Thus, the embodiments provide an embodiment of computer card 120 and a method of manufacturing computer card 120 enabling a user to connect a number of peripheral devices to electronic device 100. The embodiments also enable computer card 120 to provide functions and/or features to electronic device 100 in addition to providing interfaces to the peripheral devices. The embodiments also enable computer card 120 to provide additional user desired functionality through the connection of expansion card 140.

What is claimed is:

1. A computer card, comprising:
 a first connector to enable the computer card to communicatively couple to an electronic device when the computer card is inserted into an externally accessible slot of the electronic device;
 an expansion slot configured to receive an expansion card therein; and
 a second connector to facilitate coupling of a peripheral device to the computer card.

2. The computer card of claim 1, further comprising a bridge module configured to translate a data signal received from the expansion card to a format readable by the electronic device.

3. The computer card of claim 2, further comprising a data hub configured to channel communications between the bridge module and the electronic device.

4. The computer card of claim 1, further comprising a data hub configured to channel communications between the peripheral device coupled to the computer card and the electronic device.

5. The computer card of claim 1, wherein the expansion slot is configured to receive at least one of a flash memory card and a network card.

6. The computer card of claim 1, wherein the peripheral device is a dock.

7. A method of manufacturing a computer card, comprising:
 providing a connector on the computer card to enable the computer card to communicatively couple to an electronic device when the computer card is inserted into an externally accessible slot of the electronic device; and
 providing an expansion slot on the computer card configured to receive an expansion card therein.

8. The method of claim 7, further comprising coupling a bridge module to the expansion slot, wherein the bridge module is configured to translate a data signal received from the expansion card to a format readable by the electronic device.

9. The method of claim 8, further comprising coupling a data hub to the bridge module, wherein the data hub is configured to channel communications between the bridge module and the electronic device.

10. The method of claim 7, further comprising coupling a data hub to a dock, wherein the data hub is configured to channel communications between a dock coupled to the computer card and the electronic device.

11. The method of claim 7, further comprising providing the expansion slot configured to receive at least one of a flash memory card and a network card.

12. The method of claim 7, further comprising providing another connector to facilitate coupling of a dock to the computer card.

13. The method of claim 7, further comprising providing a module configured to enable the computer card to provide a card-specific function to the electronic device.

14. A computer card, comprising:
 a first connector to enable the computer card to communicatively couple to an electronic device when the computer card is inserted into an externally accessible slot of the electronic device;
 a module configured to enable the computer card to provide a card-specific function to the electronic device; and
 a second connector to enable the computer card to be communicatively coupled to a peripheral device.

15. The computer card of claim 14, further comprising a data hub configured to channel communications between the peripheral device and the electronic device.

16. The computer card of claim 14, wherein the peripheral device comprises a dock.

17. The computer card of claim 14, further comprising an expansion slot configured to receive an expansion card therein.

18. The computer card of claim 17, further comprising a bridge module configured to translate a data signal received from the expansion card to a format readable by the electronic device.

19. The computer card of claim 17, further comprising a data hub configured to channel communications between a bridge module and the electronic device, wherein the bridge module is configured to translate a data signal received from the expansion card to a format readable by the electronic device.

20. The computer card of claim 17, wherein the expansion slot is configured to receive at least one of a flash memory card and a network card.

* * * * *